United States Patent
Chen

(10) Patent No.: US 10,264,640 B2
(45) Date of Patent: Apr. 16, 2019

(54) PHASE-CUT DIMMER DEVICE AND METHOD OF PHASE-CUT DIMMING FOR A LIGHTING UNIT CONTROLLED BY A ROCKER-TYPE USER INTERFACE

(71) Applicant: SIGNIFY HOLDING B.V., Eindhoven (NL)

(72) Inventor: Shangwu Chen, Wheeling, IL (US)

(73) Assignee: SIGNIFY HOLDING B.V., Eindhoven (NL)

(*) Notice: Subject to any disclaimer, the term of this patent is extended or adjusted under 35 U.S.C. 154(b) by 153 days.

(21) Appl. No.: 14/442,422

(22) PCT Filed: Nov. 11, 2013

(86) PCT No.: PCT/IB2013/060051
§ 371 (c)(1),
(2) Date: May 13, 2015

(87) PCT Pub. No.: WO2014/076623
PCT Pub. Date: May 22, 2014

(65) Prior Publication Data
US 2016/0278176 A1 Sep. 22, 2016

Related U.S. Application Data

(60) Provisional application No. 61/726,074, filed on Nov. 14, 2012.

(51) Int. Cl.
*H05B 41/16* (2006.01)
*H05B 39/04* (2006.01)
(Continued)

(52) U.S. Cl.
CPC ..... *H05B 33/0845* (2013.01); *H05B 33/0815* (2013.01); *H05B 39/044* (2013.01); *Y02B 20/146* (2013.01)

(58) Field of Classification Search
CPC ............ H05B 33/0845; H05B 33/0815; H05B 39/044
See application file for complete search history.

(56) References Cited

U.S. PATENT DOCUMENTS

| 4,398,131 A | 8/1983 | Tarroux et al. |
| 5,004,969 A | 4/1991 | Schanin |
| (Continued) | | |

FOREIGN PATENT DOCUMENTS

| CN | 101272134 A | 9/2008 |
| CN | 101346026 A | 1/2009 |
| (Continued) | | |

OTHER PUBLICATIONS

"Digital Potentiometer." Sep. 26, 2012, Resistor Guide, Accessed Web. Sep. 12, 2016, pp. 1-2 <https://web.archive.org/web/20120926043655/http://www.resistorguide.com/digital-potentiometer>.*

*Primary Examiner* — Dedei K Hammond
*Assistant Examiner* — Raymond R. Chai
(74) *Attorney, Agent, or Firm* — Akarsh P. Belagodu

(57) ABSTRACT

A device (500) and method (600) control a dimming level of one or more lighting units (130) in response to a user interaction with a reference-free user interface (410), such as a rocker-type interface. A bidirectional triode thyristor (460) supplies an AC input voltage (110) to the lighting unit(s) when it is triggered. A triggering circuit (510) triggers the bidirectional triode thyristor. The triggering circuit includes a capacitor (554) and a variable resistance element (510) which sets a time constant during each half cycle of a period of the AC input voltage for charging the capacitor to a triggering voltage which triggers the bidirectional triode thyristor. The resistance of the variable resistance element is controlled in response to a dimming input signal from the reference-free user interface. The dimming input signal (Continued)

indicates only relative changes in the output level of the lighting unit(s) with respect to the present level.

20 Claims, 8 Drawing Sheets

(51) Int. Cl.
*H05B 41/24* (2006.01)
*H05B 33/08* (2006.01)

(56) References Cited

U.S. PATENT DOCUMENTS

| | | | |
|---|---|---|---|
| 5,038,081 A | 8/1991 | Maiale, Jr. et al. | |
| 5,485,058 A | 1/1996 | Watson et al. | |
| 6,815,625 B1 | 11/2004 | Leopold et al. | |
| 7,687,940 B2 | 3/2010 | Mosebrook et al. | |
| 2002/0149328 A1* | 10/2002 | Davies | H05B 37/0281 315/291 |
| 2006/0012315 A1 | 1/2006 | McDonough et al. | |
| 2006/0023543 A1* | 2/2006 | Simons | G06F 13/4286 365/222 |
| 2007/0001654 A1 | 1/2007 | Newman, Jr. | |
| 2009/0108765 A1* | 4/2009 | Weightman | H05B 39/08 315/224 |
| 2009/0160627 A1* | 6/2009 | Godbole | H04B 3/546 340/12.33 |
| 2010/0176733 A1 | 7/2010 | King | |
| 2011/0012530 A1* | 1/2011 | Zheng | H05B 33/0815 315/294 |
| 2011/0121744 A1* | 5/2011 | Salvestrini | H05B 33/0815 315/246 |
| 2011/0140622 A1* | 6/2011 | Suzuki | H05B 33/0809 315/224 |
| 2012/0091910 A1* | 4/2012 | Zhang | H05B 33/0815 315/287 |
| 2013/0057169 A1* | 3/2013 | Harel | H05B 33/0815 315/200 R |
| 2014/0125239 A1* | 5/2014 | Sullivan | H05B 33/0815 315/200 R |

FOREIGN PATENT DOCUMENTS

| | | |
|---|---|---|
| CN | 201209836 Y | 3/2009 |
| GB | 2421366 A | 6/2006 |
| WO | 2012037434 A1 | 3/2012 |

* cited by examiner

PHASE-CUT DIMMER DEVICE AND METHOD OF PHASE-CUT DIMMING FOR A LIGHTING UNIT CONTROLLED BY A ROCKER-TYPE USER INTERFACE

CROSS-REFERENCE TO PRIOR APPLICATIONS

This application is the U.S. National Phase application under 35 U.S.C. § 371 of International Application No. PCT/IB13/060051, filed on Nov. 11, 2013, which claims the benefit of U.S. Provisional Patent Application No. 61/726,074, filed on Nov. 14, 2012. These applications are hereby incorporated by reference herein.

TECHNICAL FIELD

The present invention is directed generally to a lighting control system and method which employs a rocker control interface, and, more particularly, to a phase-cut dimmer circuit and dimming method which can be controlled by a rocker-type user interface for dimming a lighting unit.

BACKGROUND

In many lighting systems, dimming control is employed. The light output of a light source may be dimmed by a variety of different techniques, some of which depend on the type of light source which is employed. One type of dimmer is a phase-cut dimmer, for example a forward phase-cut dimmer.

FIG. 1 is a wiring diagram for a lighting system 100 with dimming control. Power is received from the public electricity grid as AC Mains voltage 110, and delivered to a load 130, for example one or more lighting units including one or more light sources under control of a phase-cut dimmer 120. In particular, phase-cut dimmer 120 may be a forward phase-cut dimmer which, for example, employs a TRIAC to cut AC Mains voltage 110 from being provided to load 130 for a Lighting system 100 may be installed in a residential or commercial building or facility.

FIG. 2A illustrates waveforms of a phase-cut dimming system when set at a first dimming level. In particular, FIG. 2A illustrates waveforms of lighting system 100 when phase-cut dimmer 120 is a forward phase-cut dimmer and is set to dim the light output of load 130 to dimmed by a relatively small amount. As illustrated in FIG. 2A, the input voltage V(input) (i.e., AC Mains) has a standard 120 VAC 60 Hz waveform according to electricity grid standards in the U.S.A. (in other countries, the voltage level and the frequency may be different—e.g., 230 VAC 50 Hz power, etc.). However, the voltage V(load) at load 130 does not follow the V(input) for the entire time of each half cycle of V(input), but instead is cutoff to be 0 V for an initial portion of each half cycle of the V(input). The point, or phase, in each half cycle at which the voltage V(load) is "cut back in" to follow V(input) so as to deliver power to load 130 is adjustable or controllable by a user via a user interface so as to control the amount of dimming applied to the light output by load 130. That is, the longer in each half cycle that the voltage V(load) is cut to zero, then the more the light output by load 130 will be dimmed. In the example shown in FIG. 2A, the power is phase-cut for less than 25% of each half cycle of V(input) so that a relatively large percentage of the available power is delivered to load 130, and the light output of load 130 is dimmed by a relatively small amount.

FIG. 2B illustrates waveforms of a phase-cut dimming system when set at a second dimming level which provides more dimming that is produced by the waveforms illustrated in FIG. 2A. In comparison to the example illustrated in FIG. 2A, the voltage V(load) at load 130 is cutoff to be 0 V for a substantially larger portion of each half cycle of the V(input)—more than 50% of each half cycle. Accordingly, much less power is delivered to load 130, and a much deeper level of dimming is achieved.

A variety of user interfaces exist for allowing a user to control the level of dimming of a lighting system. Examples of simple and well known user interfaces include sliders and rotary knobs. These kinds of user interfaces have one or more established "physical reference positions" defining minimum and/or maximum light output levels corresponding to deeper and shallower amounts of dimming, respectively. For example, a common vertical slider dimmer may allow a user to reduce the light output to a minimum level, or even turn off all light output, when the slider is in the lowest position, and to increase the light output to a maximum or full light level with little or no dimming when the slider is pushed up to the highest position. In that case, the lowest position of the slider is a physical stop that provides a physical reference position for the lowest light level, and the highest position of the slider is a physical stop that provides a physical reference position for the maximum light level. Similarly, a rotary knob user interface typically has a first stop at its most counterclockwise position that provides a physical reference position for the lowest light level, and a second stop at its most clockwise position that provides a physical reference position for the maximum light level.

The dimming circuit for use with such user interfaces can be relatively simple, with the slider or rotary knob directly adjusting the resistance value of a potentiometer or rheostat from a minimum value at one stop position to a maximum value at the other stop position, thereby setting a time constant for charging a capacitor to a triggering voltage for firing a TRIAC and setting the cut-in voltage of the phase-cut dimmer.

However, some types of user interfaces do not have one or more established "physical reference positions" defining minimum and/or maximum light output levels corresponding to deeper and shallower amounts of dimming, respectively. As used herein, the term "reference-free user interface" refers to a user interface which does not have physically defined positions corresponding to minimum and maximum dimming or light intensity settings. Accordingly, when a user interacts with a reference-free user interface, the user does not control the interface to indicate directly the level of lighting that the user wants to be provided, but rather the user controls the interface to indicate whether the present level of lighting should be increased or decreased. One example of a reference-free user interface is a rocker-type user interface.

FIG. 3 illustrates one example of a rocker-type user interface 300 for a dimmer for a lighting system. With rocker-type user interface 300, a user presses the rocker to be depressed at one end or side thereof (e.g., the topmost side 310) to increase the light output of from one or more lighting units (e.g., load 130), and presses the rocker to be depressed at the other end or side thereof (e.g., the bottommost side 320) to decrease the light output of the lighting unit(s). Since a rocker-type user interface does not include stops which provide physical reference positions to establish the minimum and maximum light output levels, some embodiments such as rocker-type user interface 300 shown in FIG. 3 include a visual indicator 330 (e.g., a series of lights or LEDs) which provides feedback to a user regarding the current light output setting of the dimmer.

Besides the rocker-type user interface, other reference-free user interfaces exist. For example a button-type user interface may include a pair buttons which a user may depress independently—one button indicating that the light level should be increased, and the other button indicating that the light level should be decreased.

In general, rocker-type user interfaces and other reference-free user interfaces which do not have physical reference positions are not able to directly adjust the resistance value of a potentiometer or rheostat, and therefore the existing dimming circuits for use with rocker-type user interfaces and similar user interfaces are generally more complicated and expensive than the dimming circuits described above for slider and rotary knob user interfaces.

FIG. 4 is a circuit diagram for a lighting system 400 with dimming control via a reference-free user interface 410 (e.g., a rocker-type user interface). Lighting system 400 includes a controller 420, a zero crossing detector (ZCD) 430, a DC voltage supply 440, a TRIAC firing circuit 450 and a TRIAC 460.

FIG. 4 actually illustrates via the dashed lines two different optional arrangements: a first arrangement where the dimming circuit is connected to the AC Mains line voltage, load 130, and the neutral wire; and a second arrangement where the dimming circuit is connected between the AC Mains line voltage and load 130, and the neutral wire is not connected to the dimming circuit. In the first case, ZCD 430 and DC voltage supply 440 are connected to the AC Mains line voltage and to the neutral wire and receive a voltage difference between the AC Mains line voltage ((V(input)) and the neutral wire (ground). In the second case, ZCD 430 and DC voltage supply 440 are connected to the AC Mains line voltage and to load 430 and receive a voltage difference between the AC Mains line voltage ((V(input)) and the load voltage (V)(load)).

In operation, ZCD detects zero crossings of the AC Mains line voltage and outputs to controller 420 a zero_crossing signal which indicates the timing of the zero crossings. DC supply 440 receives the AC Mains line voltage and supplies a DC voltage (e.g. 5 VDC) for operation of controller 420. A user may depress the rocker of rocker-type user Interface 410 to indicate that the user wants to increase, or decrease, the amount of light output by load 130. In response to a user depressing the rocker in either direction, user interface 410 supplies a dimming input control signal to controller 420. In response thereto, and considering the current light output level in response to previous inputs received via user interface 410, controller 420 determines a light or dimming level indicated by the user's interaction(s) with user interface 410, and a corresponding timing or phase with respect to the zero crossing time of the AC Mains line voltage to cut in the voltage V(load) to load 130 so as to provide the desired light or dimming level. Controller 420 outputs a dimming control signal to TRIAC firing circuit 450 which determines the timing when TRIAC firing circuit 450 triggers TRIAC 460 to conduction, thereby setting the timing in each half phase of the AC Mains line voltage (V(input)) when V(load) provides power to load 130.

However, the dimming circuit of lighting system 400 has some drawbacks. As noted above, the dimming circuit is somewhat complicated and more expensive than a potentiometer-based dimming circuit. Furthermore, when there is a lot of noise on the AC Mains line voltage, or when the frequency of the AC Mains line voltage is drifting, then the zero crossing time detected by ZCD 430 may be inaccurate and may vary from cycle to cycle, making it difficult or impossible for controller 420 to properly control the phase-cut dimming without some undesirable amount of time-dependent light variation or blinking. Additionally, in the case when the dimming circuit is connected between the AC Mains line voltage and the load and the neutral wire is not connected to the dimming circuit, the zero-crossing signal is not stable and is highly dependent on the load characteristic, for example during On/Off transitions, etc.

Thus, it would be desirable to provide a dimming circuit for a user interface which does not have established "physical reference positions" defining minimum and/or maximum light output levels which can overcome at least some of these drawbacks. In particular, it would be desirable to provide such a dimming circuit which can operate without a zero crossing detector.

SUMMARY

The present disclosure is directed to inventive methods and apparatus for a phase-cut dimmer circuit which can be controlled by a rocker-type user interface for dimming a lighting unit or units.

Generally, in one aspect a device comprises: a bidirectional triode thyristor configured to supply an AC input voltage to one or more lighting units when the bidirectional triode thyristor is triggered; a triggering circuit configured to trigger the bidirectional triode thyristor, the triggering circuit including a variable resistance element, wherein a resistance of the variable resistance element sets a triggering time during each half cycle of a period of the AC input voltage when the bidirectional triode thyristor is triggered; and a controller configured to receive a dimming input signal from a reference-free user interface in response to a user interaction with the reference-free user interface, wherein the controller is further configured in response to the dimming input signal to control the resistance of the variable resistance element to set the triggering time for triggering the bidirectional triode thyristor so as to control a light output by the lighting unit(s) in response to the dimming input signal.

In one or more embodiments, the variable resistance element comprises a resistor ladder having a plurality of switches and resistors, and wherein the controller is configured to open and close selected ones of the switches to control the resistance of the variable resistance element.

In one or more embodiments, the variable resistance element is a digital rheostat comprises: an interface configured to receive from the controller a digital value corresponding to a selected value of the resistance of the variable resistance element; a register configured to store the digital value; and a variable resistor whose resistance is selected by the digital value stored in the register.

In one or more embodiments, the device also includes first and second input terminals configured to receive the AC input voltage, and the triggering circuit further comprises: a fixed resistor connected in series between the first input terminal and a first terminal of the variable resistance element; a capacitor connected between a second terminal of the variable resistance element and the second input terminal; a symmetrical trigger diode connected in series between the second terminal of the variable resistance element and a gate of the bidirectional triode thyristor; and a threshold voltage device connected between the first terminal of the variable resistance element and the second input terminal In one or more embodiments, the device also includes a DC supply configured to receive the AC input voltage and in response thereto to output a DC voltage for supplying power to the controller.

In one or more embodiments, the controller comprises a processor and memory configured to store executable program instructions to be executed by the processor.

In one or more embodiments, the device comprises a Quadrac which includes the bidirectional triode thyristor and further includes a symmetrical trigger diode connected to a gate of the bidirectional triode thyristor for triggering the bidirectional triode thyristor.

In one or more embodiments, the device includes the user interface.

According to one optional feature of these embodiments, the user interface is a rocker-type user interface.

According to another optional feature of these embodiments, the user interface is a button-type user interface.

Generally, in another aspect, a method, comprises: receiving an AC input voltage; receiving a dimming input signal in response to a user interaction with a reference-free user interface; in response to the dimming input signal, controlling a resistance of a variable resistance element to set a triggering time during each half cycle of a period of the AC input voltage when a bidirectional triode thyristor is triggered; and supplying the AC input voltage to one or more lighting units when the bidirectional triode thyristor is triggered so as to control a light output by the lighting unit(s) in response to the dimming input signal.

In one or more embodiments, the AC input voltage is an AC Mains voltage.

In one or more embodiments, the variable resistance element comprises a resistor ladder having a plurality of switches and resistors, and controlling the resistance of the variable resistance element comprises opening and closing selected ones of the switches to control the resistance of the variable resistance element.

In one or more embodiments, the variable resistance element is a digital rheostat, and controlling the resistance of the variable resistance element comprises: communicating a digital value from a controller to the digital rheostat, the digital value corresponding to a selected value of the resistance of the variable resistance element; storing the digital value in a register; and controlling a resistance of the variable resistance element in response to the stored digital value to have the selected value.

In one or more embodiments: a fixed resistor is connected in series between a first input terminal for receiving the AC input voltage and a first terminal of the variable resistance element; a capacitor is connected between a second terminal of the variable resistance element and a second input terminal for receiving the AC input voltage; a symmetrical trigger diode is connected in series between the second terminal of the variable resistance element and a gate of the bidirectional triode thyristor; and a threshold voltage device is connected between the first terminal of the variable resistance element and the second input terminal. Controlling the resistance of the variable resistance element to set a triggering time during each half cycle of a period of the AC input voltage when a bidirectional triode thyristor is triggered comprises selecting the resistance of the variable resistance element to set a time constant for charging the capacitor to a triggering voltage.

According to one or more embodiments, the reference-free user interface comprises one of a rocker-type user interface and a button-type user interface.

Generally, in yet another aspect, a device comprises: a bidirectional triode thyristor configured to supply an AC input voltage to one or more lighting units when the bidirectional triode thyristor is triggered; and a triggering circuit configured to trigger the bidirectional triode thyristor. The triggering circuit includes a capacitor and a variable resistance element. The resistance of the variable resistance element is configured to set a time constant during each half cycle of a period of the AC input voltage for charging the capacitor to a triggering voltage which triggers the bidirectional triode thyristor. The resistance of the variable resistance element is controlled in response to a dimming input signal produced from a user interaction with a reference-free user interface. The dimming input signal indicates that a light output level of the lighting unit(s) should be increased or decreased with respect to a present level, but does not indicate a selection of a relative level of the light output with respect to a minimum or maximum light output level of the lighting unit(s).

According to one or more embodiments, the device further comprises a controller configured to receive the dimming input signal and in response thereto to produce a dimming output signal for controlling the resistance of the variable resistance element.

In one optional feature of these embodiments, the variable resistance element comprises a resistor ladder having a plurality of switches and resistors, and wherein the controller is configured to open and close selected ones of the switches to control the resistance of the variable resistance element.

In another optional feature of these embodiments, the variable resistance element is a digital rheostat comprising: an interface configured to receive from the controller a digital value corresponding to a selected value of the resistance of the variable resistance element; a register configured to store the digital value; and a variable resistor whose resistance is selected by the digital value stored in the register.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, and other types of electroluminescent sources.

A "lighting driver" is used herein to refer to an apparatus that supplies electrical power to one or more light sources in a format to cause the light sources to emit light. In particular, a lighting driver may receive electrical power in a first format (e.g., AC Mains power; a fixed DC voltage; etc.) and supplies power in a second format that is tailored to the requirements of the light source(s) (e.g., LED light source(s)) that it drives.

The term "lighting module" is used herein to refer to a module, which may include a circuit board (e.g., a printed circuit board) having one or more light sources mounted thereon, as well as one or more associated electronic components, such as sensors, current sources, etc., and which is configured to be connected to a lighting driver. Such lighting modules may be plugged into slots in a lighting fixture, or a motherboard, on which the lighting driver may be provided. The term "LED module" is used herein to refer to a module, which may include a circuit board (e.g., a printed circuit board) having one or more LEDs mounted thereon, as well as one or more associated electronic components, such as sensors, current sources, etc., and which is configured to be connected to a lighting driver. Such lighting modules may be plugged into slots in a lighting fixture, or a motherboard, on which the lighting driver may be provided.

The terms "lighting unit" is used herein to refer to an apparatus including one or more light sources of the same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry; a lighting driver) relating to the operation of the light source(s). An "LED-based lighting unit" refers to a lighting unit that includes one or more LED-based light sources as discussed above, alone or in combination with other non LED-based light sources.

The terms "lighting fixture" and "luminaire" are used herein interchangeably to refer to an implementation or arrangement of one or more lighting units in a particular form factor, assembly, or package, and may be associated with (e.g., include, be coupled to and/or packaged together with) other components.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

As discussed above, existing circuits and methods which employ a zero crossing detector for dimming a light element or elements in response to a user interaction with a reference-free user interface have several drawbacks in terms of cost, complexity and performance.

Therefore, the present inventor has recognized and appreciated that it would be beneficial to provide dimming circuit and dimming method for use with a reference-free user interface that can mitigate one or more of these drawbacks.

In view of the foregoing, various embodiments and implementations of the present invention are directed to dimming circuits and methods for dimming a light element or elements in response to a user interaction with a reference-free user interface which do not employ a zero crossing detector.

Figure 5:
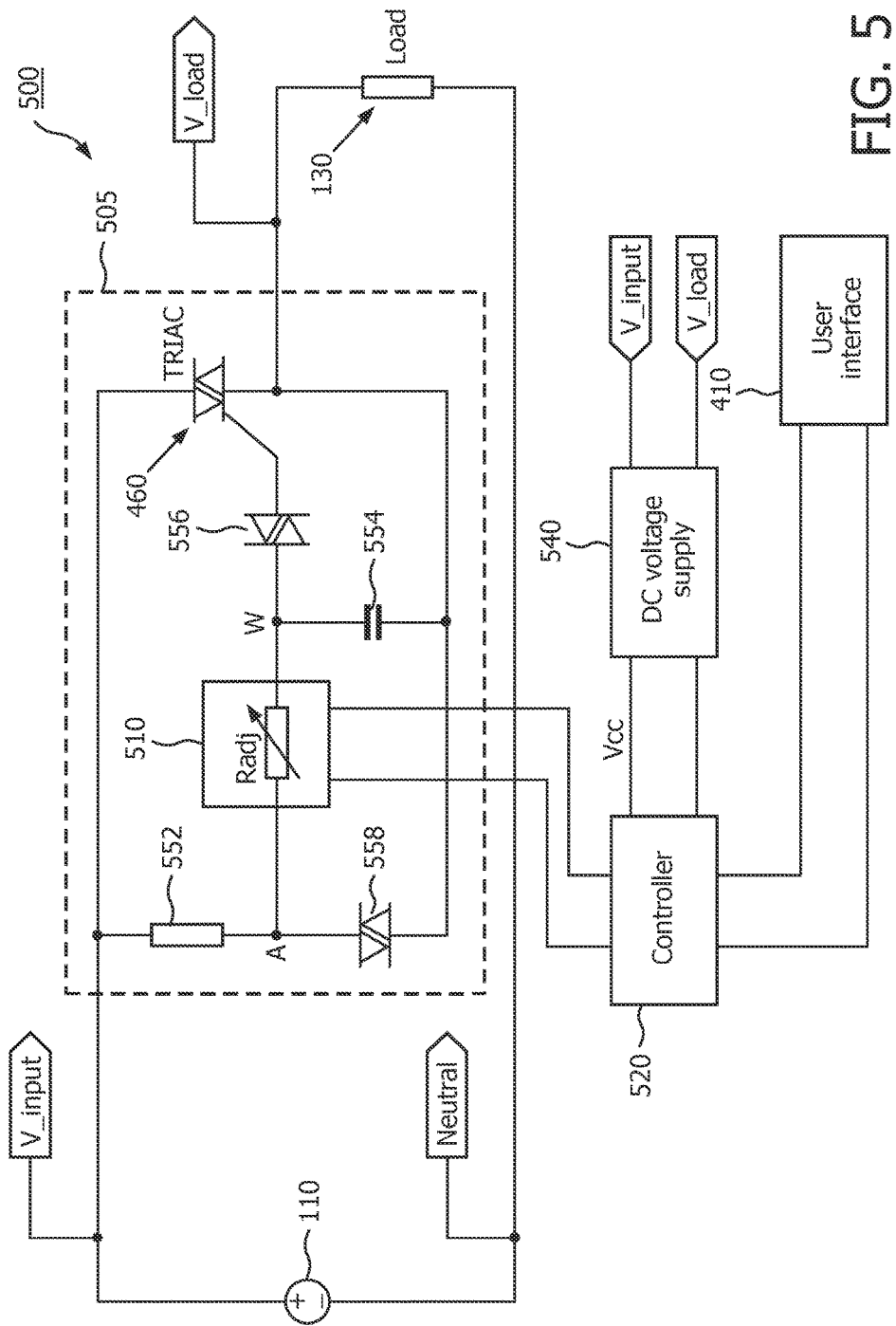
FIG. 5 is a circuit diagram for a lighting system with dimming control via a reference-free user interface, where the circuit does not require or employ a zero crossing detector.

FIG. 5 is a circuit diagram for a lighting system 500 with dimming control of light output by a load 130 via a reference-free user interface (e.g., a rocker-type user interface) 410, where the circuit does not require or employ a zero crossing detector. Lighting system 500 includes a dimming circuit 505, a controller 520, a DC supply voltage 540, and reference-free user interface 410 (e.g., a rocker-type user interface).

Dimming circuit 505 includes a variable resistance element 510 having a variable resistance value Radj, a resistor 552, a capacitor 554, a symmetrical trigger diode 556 (e.g., a DIAC), a bidirectional triode thyristor 460 (e.g., a TRIAC), and a threshold voltage device (e.g., a DIAC or two Zeners in series with each other and in opposite polarity from each other) 558.

Controller 520 may include a processor (e.g., a microprocessor), and may also include memory (e.g., nonvolatile memory) which stores executable program instructions or code for an algorithm to be executed by the processor.

DC voltage supply 540 is configured to receive an AC input voltage from AC Mains 110 and to supply a DC voltage (e.g., +5 VDC) to controller 520. In some embodiments, such as is illustrated in FIG. 5, dimming circuit 505 is connected between the AC Mains line voltage (V(input)) and load 130 and the neutral wire is not connected to dimming circuit 505. In that case, DC supply voltage 540 receives a voltage difference between the AC Mains line voltage ((V(input)) and the load voltage (V)(load)). In other embodiments, dimming circuit 505 is connected to the AC Mains line voltage (V(input)), to load 130 and to the neutral wire. In that case, DC supply voltage 540 receives a voltage difference between the AC Mains line voltage ((V(input)) and the neutral wire (ground), or between the load voltage (V(load)) and the neutral wire (ground).

Beneficially, load 130 comprises one or more lighting units of lighting modules which may include a lighting fixture or luminaire. In various embodiments, load 130 may include one or more LED-based lighting units, including one or more associated lighting drivers and one or more LED light sources. In other embodiments, load 130 may include one or more other types of light sources.

Figure 1:
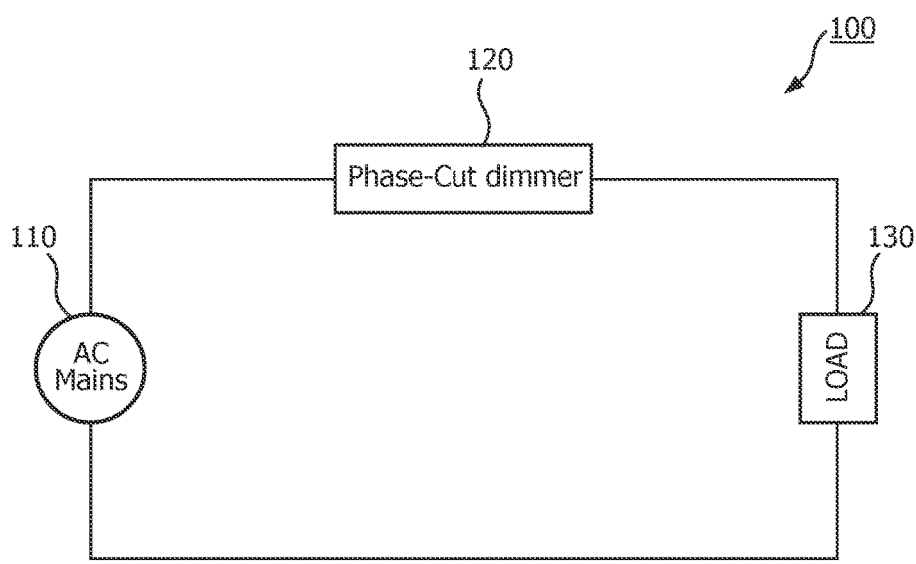
FIG. 1 is a wiring diagram for a lighting system with dimming control.
Figure 2A:
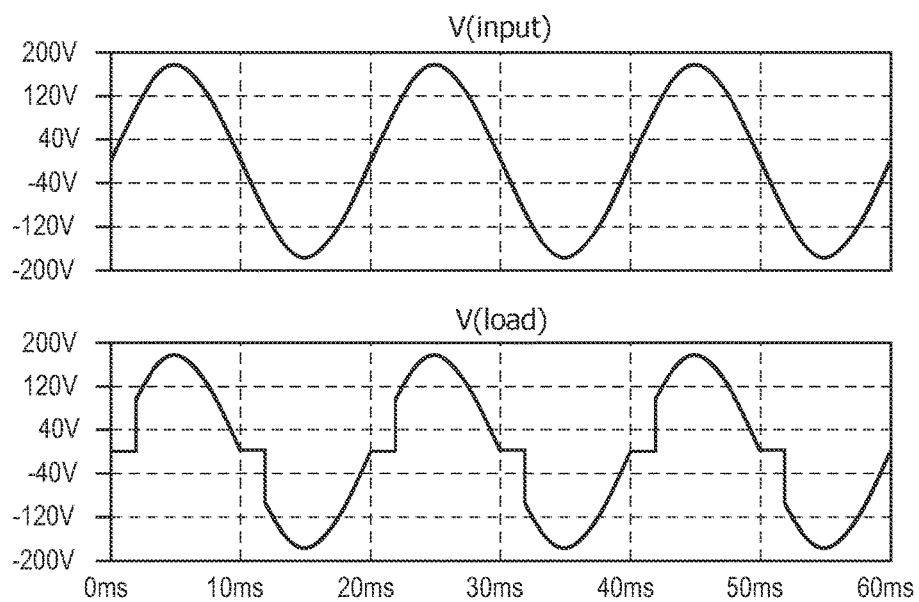
FIG. 2A illustrates waveforms of a phase-cut dimming system when set at a first dimming level.
Figure 2B:
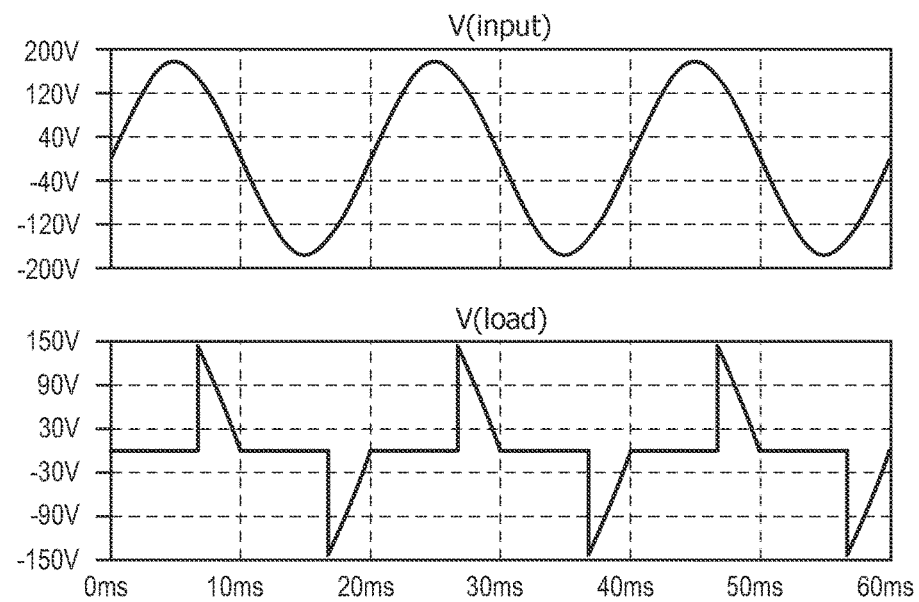
FIG. 2B illustrates waveforms of a phase-cut dimming system when set at a second dimming level which provides more dimming that is produced by the waveforms illustrated in FIG. 2A.
Figure 3:
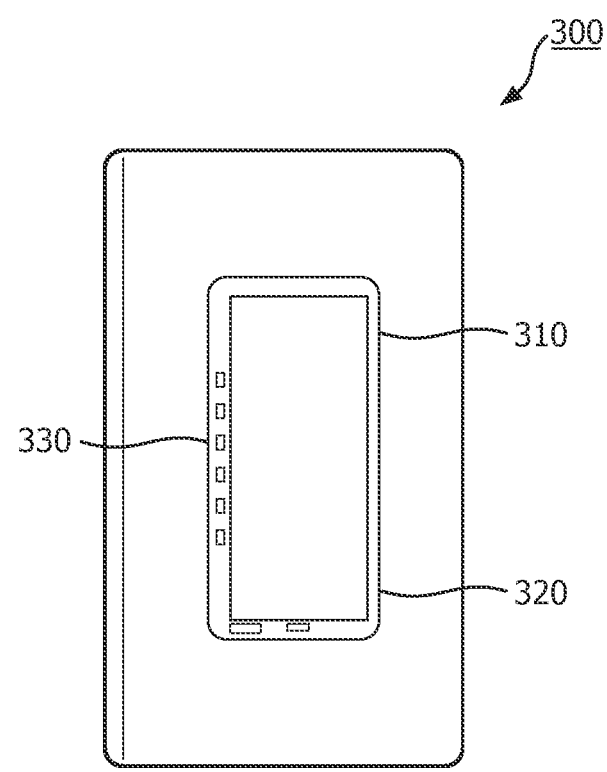
FIG. 3 illustrates one example of a rocker-type user interface for a dimmer for a lighting system.
Figure 4:
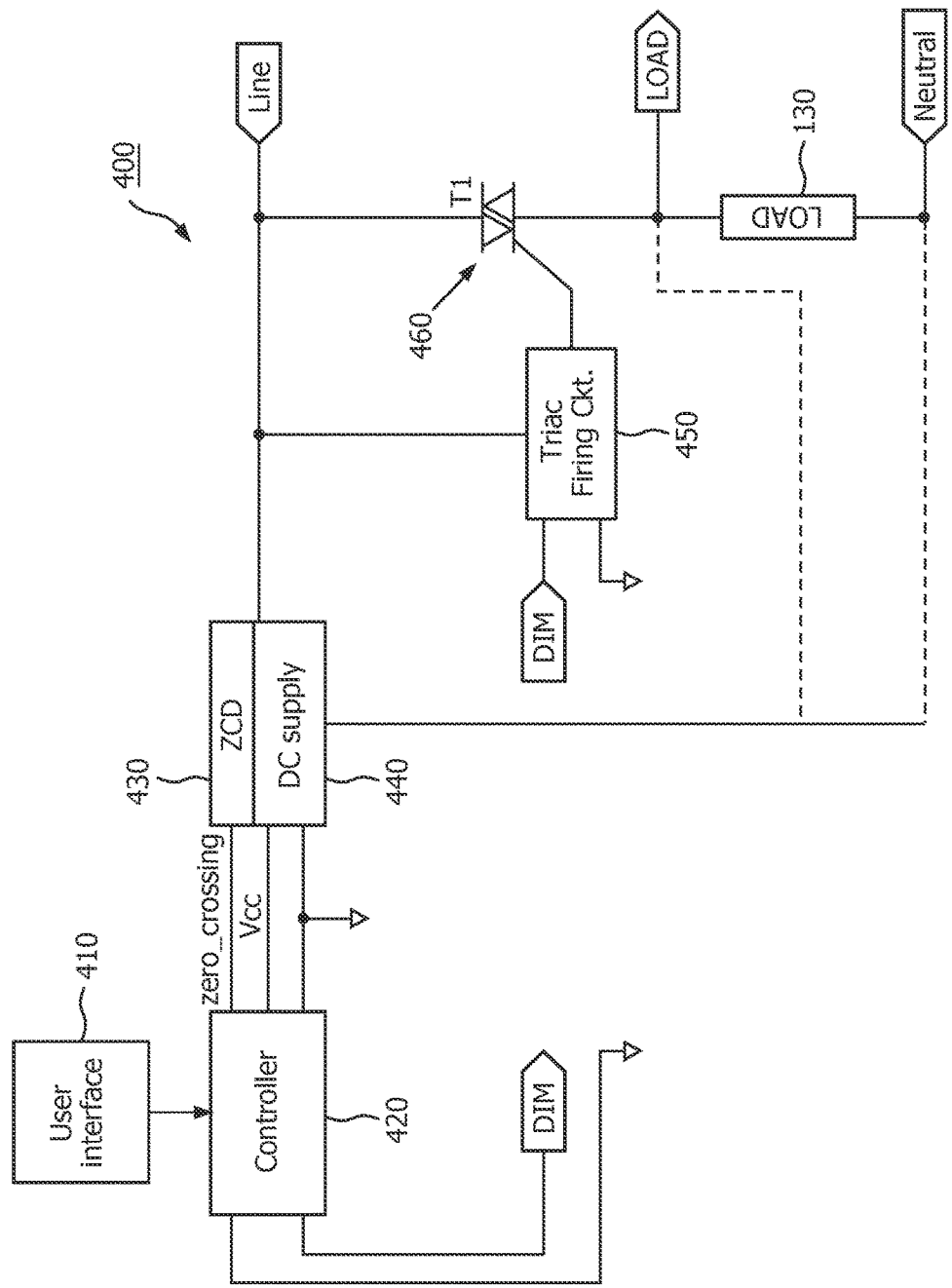
FIG. 4 is a circuit diagram for a lighting system with dimming control via a rocker-type user interface, where the circuit employs a zero crossing detector.

In operation, lighting system 500 receives the AC input voltage from AC Mains 110, for example a standard 120 VAC 60 Hz waveform according to electricity grid standards in the U.S. Bidirectional triode thyristor 460 (e.g., a TRIAC) triggers or fires to supply power from AC Mains 110 to load 130 when a current applied to its gate is greater than a gate threshold current value is. Bidirectional triode thyristor 460 remains triggered or turned on until the conduction current passing through the thyristor's two main terminals other than the gate terminal drops below a lower threshold referred to as the holding current. Accordingly, beginning at the start of each half cycle of the AC input voltage, bidirectional triode thyristor 460 is turned off so as to open the circuit connection through load 130, thereby preventing power from AC Mains 110 from being applied to load 130. However, as soon as the magnitude of the positive or negative current to the gate of bidirectional triode thyristor 460 reaches the gate threshold current value, then bidirectional triode thyristor 460 turns on and power from AC Mains 110 is supplied to load 130. Referring back to FIGS. 2A-B and the accompanying description thereof above, it can be seen that by controlling or varying the time in each half cycle of the AC input voltage when bidirectional triode thyristor 460 turns on, one can control or vary the amount of light output by load 130.

Furthermore, the provision of the gate current to bidirectional triode thyristor 460 is controlled by symmetrical trigger diode 556 (e.g., a DIAC). At the beginning of each half cycle of the AC input voltage, when the voltage is zero, symmetrical trigger diode 556 is in a high-resistance (non-conducting) state and does not supply a gate current to trigger or fire bidirectional triode thyristor 460. So long as the magnitude of the voltage (i.e., positive or negative voltage) applied to symmetrical trigger diode 556 is less than its breakdown voltage (e.g. 30 volts), symmetrical trigger diode 556 remains in a high-resistance (non-conducting) state. However, once the magnitude of the voltage applied to symmetrical trigger diode 556 reaches the breakdown voltage, then symmetrical trigger diode 556 is turned on and current flows therethrough, in turn triggering or firing bidirectional triode thyristor 460 and connecting load 130 to receive power from AC Mains 110. Symmetrical trigger diode 556 remains "in conduction" until the current through it drops below its holding current. Below this value, symmetrical trigger diode 556 switches back to its high-resistance (non-conducting) state until turned on again in the next half cycle of the AC input voltage.

Meanwhile, the voltage applied to symmetrical trigger diode 556 is determined by the voltage charged onto capacitor 554. In every half cycle of the AC input voltage, as the magnitude of the voltage of the AC input voltage increases from zero, the magnitude of the voltage on capacitor 554 is charged through resistor 552, variable resistance element 510, and threshold voltage device 558 until it reaches the breakdown voltage of symmetrical trigger diode 556. As explained above, when the voltage on capacitor 554 reaches the breakdown voltage of symmetrical trigger diode 556, then symmetrical trigger diode 556 conducts current and turns on bidirectional triode thyristor 460. Here, it can be seen that the time required to charge capacitor 554 to reach the breakdown voltage of symmetrical trigger diode 556 depends on the resistance value Radj of variable resistance device 510. In particular, as Radj is increased from its minimum value to its maximum value, then the time required in each half cycle of the AC input voltage to charge capacitor 554 to break down symmetrical trigger diode 556 and thereby trigger or fire bidirectional triode thyristor 460 increases. As this time increases, then the mount of power delivered to load 130 is reduced, and the amount of light output by load 130 decreases (i.e., more dimming is applied).

Accordingly, it can be seen from the above description that the level of light output by load 130 can be adjusted from its minimum level (e.g., full dimming) to its maximum level (e.g., full brightness) by adjusting the resistance Radj of variable resistance element 510 from its maximum value to its minimum value. More specifically, the brightness level of the light output by load 130 may be set to a desired level by setting the resistance Radj of variable resistance device 510 to have a corresponding value.

Therefore, when a user desires to adjust the brightness level of the light output by load 130, the user interacts with reference-free user interface 410. Rather than setting a relative level of the light output by load 130 with respect to minimum and maximum light output levels, as would be done with a slider or rotary dial user interface, beneficially with reference-free user interface 410 the user simply indicates that she/he wants to increase or decrease the level of light produced by load 130 (decrease or increase the amount of dimming) with respect to the present light output level. This may be done, for example, by "rocking" a rocker-type user interface toward the top to indicate that the light level should be increased, or rocking the rocker-type user interface toward the bottom to indicate that the light level should be decreased. In response to the user interaction, reference-free user interface 410 outputs a dimming input signal to controller 520. Here, the dimming input signal indicates that a light output level of the lighting unit(s) of load 130 should be increased or decreased with respect to the present light level. However, in general the dimming input signal may not indicate any particular relative level of the light output by load 130 with respect to a minimum or minimum light output level of load 130. In some embodiments, the amount by which the light level should be increased or decreased may depend on how long the user rocks the rocker-type user interface up or down.

In response to the dimming input signal from reference-free user interface 410, controller 520 controls or sets the resistance value Radj of variable resistance element 510 to a desired value corresponding to a desired light output level for load 140, as explained above.

Figure 6:
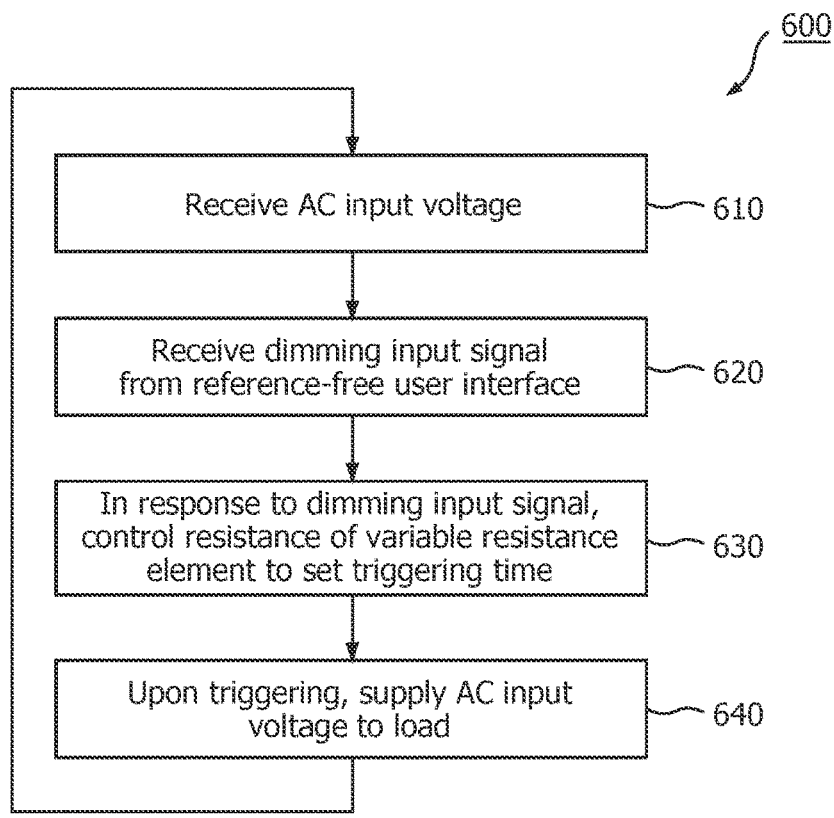
FIG. 6 illustrates a method of dimming a lighting system having one or more lighting units in response to a dimming input signal from a reference-free user interface.

FIG. 6 illustrates a method 600 of dimming a lighting system having one or more lighting units, or controlling a light output level of a lighting system having one or more lighting units, in response to a dimming input signal from a reference-free user interface. The method 600 may be applied by the lighting system 500 of FIG. 5.

In a step 610, an AC input voltage is supplied to the lighting system. The AC input voltage may be supplied by AC Mains and is the power source for the lighting unit(s).

In step 620, a controller in the lighting system receives a dimming input signal from a reference-free user interface, such a rocker-type user interface, as a result of a user interaction with the reference-free user interface. Beneficially, the dimming input signal simply indicates that the level of light produced by the one or more lighting units should be increased or decreased with respect to the present light output level, rather than indicating a particular relative level of light which should be produced with respect to minimum and maximum light output levels of the one or more lighting units.

In step 630, in response to the dimming input signal, a controller controls or adjusts a resistance of a variable resistance device in a dimming circuit to have a desired value so as to increase or decrease the light output level in accordance with the dimming input signal.

In step 640, a triggering device (e.g., a TRIAC) in the dimming circuit fires within each half cycle of the AC input voltage at a time which is determined by the resistance of the variable resistance device so as to deliver power to the one or more lighting units and thereby cause the one or more lighting units to produce an increased or decreased amount of light.

Figure 7:
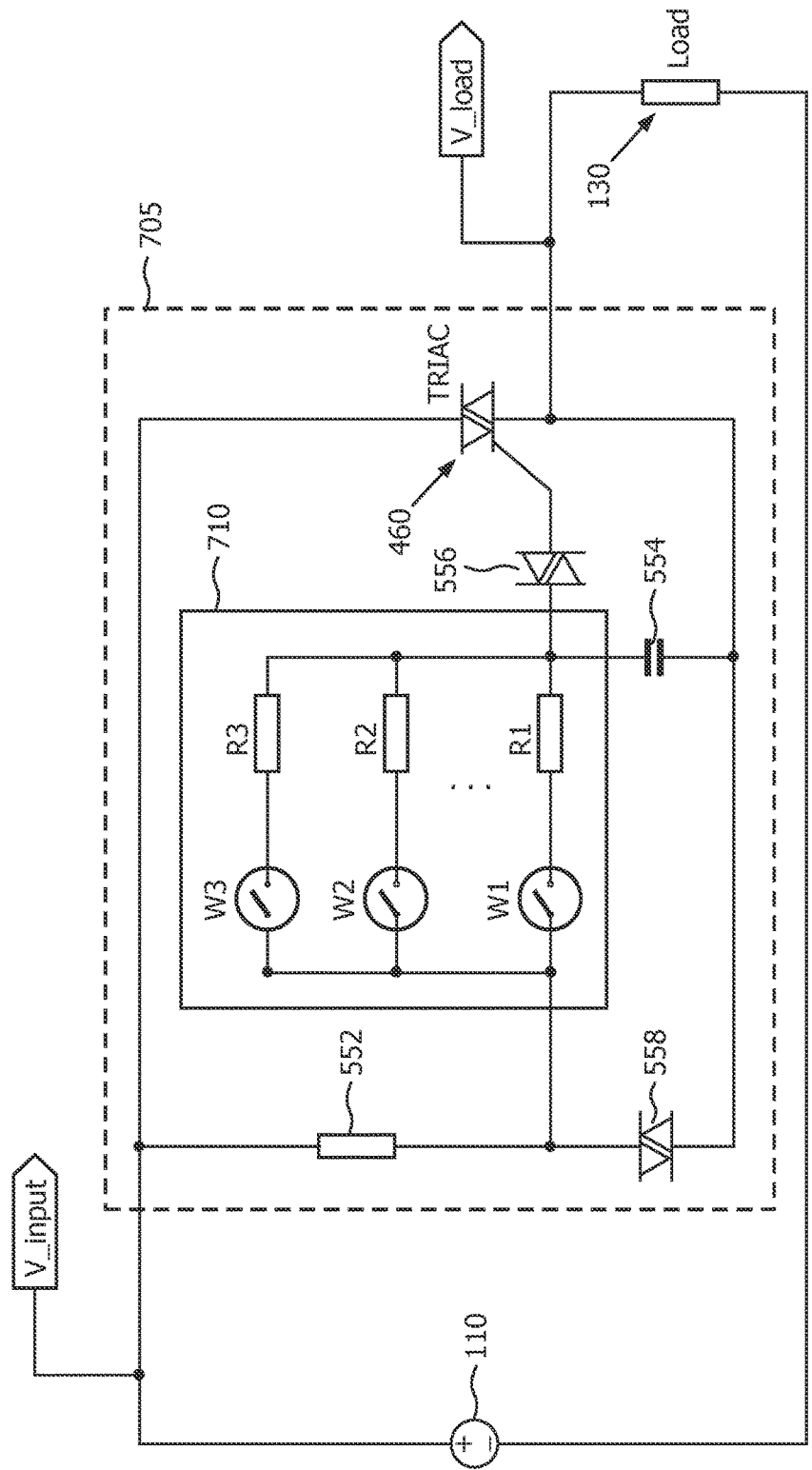
FIG. 7 illustrates one embodiment of a dimming circuit which may be employed in the lighting system of FIG. 5.

FIG. 7 illustrates one embodiment of a dimming circuit 705 which may be employed in the lighting system of FIG. 5. In particular, dimming circuit 705 is one embodiment of dimming circuit 505 in lighting system 500. Dimming circuit 705 includes a variable resistance element 610, a resistor 552, a capacitor 554, a symmetrical trigger diode 556 (e.g., a DIAC), a bidirectional triode thyristor 460 (e.g., a TRIAC), and a threshold voltage device (e.g., a DIAC or a pair of Zener diodes connected in series with each other and in opposite polarity from each other) 558.

In dimming circuit 705, variable resistance element 610 comprises a resistor ladder having a plurality of switches W1, W2, W3, . . . and corresponding resistors R1, R2, R3, . . . . In operation, controller 520 is configured to provide at least one electrical signal to open and close selected ones of the switches W1, W2, W3, . . . to set or adjust the overall resistance of variable resistance element 610. In general, as more resistors are included in the resistor ladder of variable resistance element 610, the resistance value of variable resistance element 610 can be adjusted or controlled more smoothly to provide more precise control of the amount of light output by load 130. Although variable resistance element 610 is shown with a resistor ladder having a relatively simple configuration of resistors all in parallel with each other, in other embodiments resistor ladders have other configurations may be employed instead.

Figure 8:
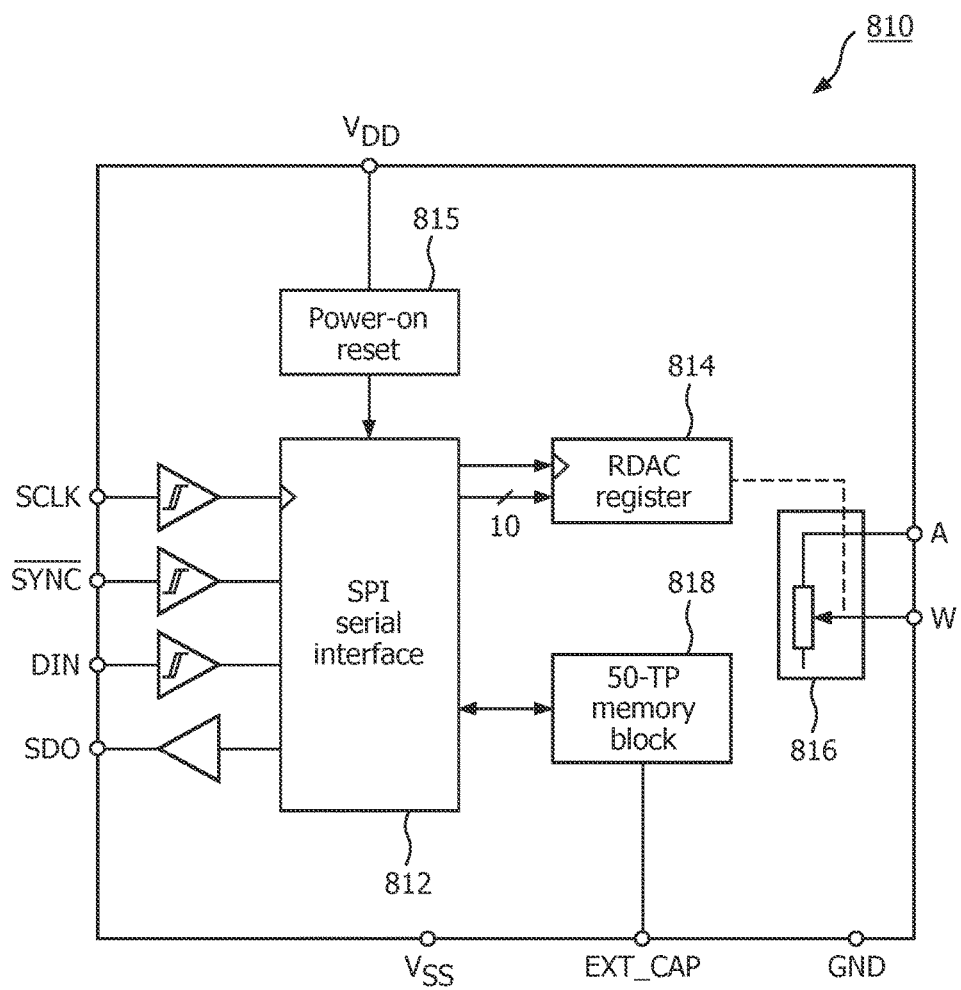
FIG. 8 illustrates another embodiment of a variable resistance element which may be employed in the lighting system of FIG. 5.

FIG. 8 illustrates another embodiment of a variable resistance element 810 which may be employed in the lighting system of FIG. 5. Variable resistance element 810 includes a serial interface 812, an RDAC register 814, a power-on reset circuit 815, an M-tap variable resistor 816 (e.g., M=1024, and a memory block 818.

In operation, serial interface 812 is configured to receive from controller 520 at least one electrical signal conveying a digital value corresponding to a selected value of the resistance of variable resistance element 810 corresponding to a desired level or brightness of light output by load 130. RDAC register 814 stores the digital value, and the resistance of variable resistor 816 is selected by the digital value stored in RDAC register 814.

In one embodiment, variable resistance element 810 may be a model AD5174 digital rheostat manufactured by ANALOG DEVICES of Norwood, Mass.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles,

The invention claimed is:

1. A device, comprising:
   a bidirectional triode thyristor configured to supply an AC input voltage to one or more lighting units when the bidirectional triode thyristor is triggered;
   a triggering circuit configured to trigger the bidirectional triode thyristor, the triggering circuit including a variable resistance element, wherein a resistance of the variable resistance element sets a triggering time during each half cycle of a period of the AC input voltage when the bidirectional triode thyristor is triggered; and
   a controller configured to receive a dimming input signal from a reference-free user interface in response to a user interaction with the reference-free user interface, wherein the controller is further configured in response to the dimming input signal to produce at least one electrical signal and to supply the at least one electrical signal to the variable resistance element to control the resistance of the variable resistance element to set the triggering time for triggering the bidirectional triode thyristor so as to control a light output by the one or more lighting units in response to the dimming input signal.

2. The device of claim 1, wherein the variable resistance element comprises a resistor ladder having a plurality of switches and resistors, and wherein the controller is configured to open and close selected ones of the switches to control the resistance of the variable resistance element.

3. The device of claim 1, wherein the variable resistance element is a digital rheostat comprising:
   an interface configured to receive from the controller a digital value corresponding to a selected value of the resistance of the variable resistance element;
   a register configured to store the digital value; and
   a variable resistor whose resistance is selected by the digital value stored in the register.

4. The device of claim 1, including first (V_input) and second (Neutral) input terminals configured to receive the AC input voltage, and wherein the triggering circuit further comprises:
   a fixed resistor connected in series between the first input terminal and a first terminal (A) of the variable resistance element;
   a capacitor connected between a second terminal (W) of the variable resistance element and the second input terminal;
   a symmetrical trigger diode connected in series between the second terminal of the variable resistance element and a gate of the bidirectional triode thyristor; and
   a threshold voltage device connected between the first terminal of the variable resistance element and the second input terminal.

5. The device of claim 1, further comprising a DC supply configured to receive the AC input voltage and in response thereto to output a DC voltage for supplying power to the controller.

6. The device of claim 1, wherein the controller comprises a processor and memory configured to store executable program instructions to be executed by the processor.

7. The device of claim 1, comprising a quadrac which includes the bidirectional triode thyristor (460) and further includes a symmetrical trigger diode connected to a gate of the bidirectional triode thyristor for triggering the bidirectional triode thyristor.

8. The device of claim 1, further comprising the reference-free user interface.

9. The device of claim 1, wherein the reference-free user interface is a rocker-type user interface.

10. The device of claim 1, wherein the reference-free user interface is a button-type user interface.

11. A method comprising:
    receiving an AC input voltage;
    receiving a dimming input signal in response to a user interaction with a reference-free user interface;
    in response to the dimming input signal, producing at least one electrical signal and supplying the at least one electrical signal to a variable resistance element to control a resistance of the variable resistance element to set a triggering time during each half cycle of a period of the AC input voltage when a bidirectional triode thyristor is triggered; and
    supplying the AC input voltage to one or more lighting units when the bidirectional triode thyristor is triggered so as to control a light output by the one or more lighting units in response to the dimming input signal.

12. The method of claim 11, wherein the AC input voltage is an AC Mains voltage.

13. The method of claim 11, wherein the variable resistance element comprises a resistor ladder having a plurality of switches and resistors, and wherein controlling the resistance of the variable resistance element comprises opening and closing selected ones of the switches to control the resistance of the variable resistance element.

14. The method of claim 11, wherein the variable resistance element is a digital rheostat, and wherein controlling the resistance of the variable resistance element comprises:
    communicating a digital value from a controller to the digital rheostat, the digital value corresponding to a selected value of the resistance of the variable resistance element;
    storing the digital value in a register; and
    controlling a resistance of the variable resistance element in response to the stored digital value to have the selected value.

15. The method of claim 11, wherein:
    a fixed resistor is connected in series between a first input terminal (V_input) for receiving the AC input voltage, and a first terminal (A) of the variable resistance element;
    a capacitor is connected between a second terminal (W) of the variable resistance element and a second input terminal (neutral) for receiving the AC input voltage;
    a symmetrical trigger diode is connected in series between the second terminal of the variable resistance element and a gate of the bidirectional triode thyristor; and a threshold voltage device is connected between the first terminal of the variable resistance element and the second input terminal, and wherein the at least one electrical signal controls the resistance of the variable resistance element to set the triggering time during each half cycle of a period of the AC input voltage when the bidirectional triode thyristor is triggered by selecting the resistance of the variable resistance element to set a time constant for charging the capacitor to a triggering voltage.

16. The method of claim 11, wherein the reference-free user interface comprises one of a rocker-type user interface and a button-type user interface.

17. A device, comprising:

a bidirectional triode thyristor configured to supply an AC input voltage to one or more lighting units when the bidirectional triode thyristor is triggered; and a triggering circuit configured to trigger the bidirectional triode thyristor, the triggering circuit including a capacitor and a variable resistance element, wherein a resistance of the variable resistance element is configured to set a time constant during each half cycle of a period of the AC input voltage for charging the capacitor to a triggering voltage which triggers the bidirectional triode thyristor, wherein the resistance of the variable resistance element is controlled by at least one electrical signal which is generated in response to a dimming input signal produced from a user interaction with a reference-free user interface, where the dimming input signal indicates that a light output level of the one or more lighting units should be increased or decreased with respect to a present level, but does not indicate a selection of a relative level of the light output with respect to a minimum or maximum light output level of the one or more lighting units.

18. The device of claim 17, further comprising a controller configured to receive the dimming input signal and in response thereto to produce a dimming output signal as the at least one electrical signal for controlling the resistance of the variable resistance element.

19. The device of claim 18, wherein the variable resistance element comprises a resistor ladder having a plurality of switches and resistors, and wherein the controller is configured to open and close selected ones of the switches to control the resistance of the variable resistance element.

20. The device of claim 18, wherein the variable resistance element is a digital rheostat comprising:

an interface configured to receive from the controller a digital value corresponding to a selected value of the resistance of the variable resistance element;

a register configured to store the digital value; and a variable resistor whose resistance is selected by the digital value stored in the register.

\* \* \* \* \*